United States Patent
Herberth et al.

(10) Patent No.: US 10,088,319 B2
(45) Date of Patent: Oct. 2, 2018

(54) METHOD FOR DETERMINING STATES OF A SYSTEM USING AN ESTIMATION FILTER

(71) Applicant: NORTHROP GRUMMAN LITEF GMBH, Freiburg (DE)

(72) Inventors: Uwe Herberth, Hugstetten (DE); Tim Martin, Freiburg (DE)

(73) Assignee: Northrop Grumman LITEF GmbH (DE)

( * ) Notice: Subject to any disclaimer, the term of this patent is extended or adjusted under 35 U.S.C. 154(b) by 0 days.

(21) Appl. No.: 15/572,566

(22) PCT Filed: Mar. 23, 2016

(86) PCT No.: PCT/EP2016/056389
§ 371 (c)(1),
(2) Date: Nov. 8, 2017

(87) PCT Pub. No.: WO2016/180566
PCT Pub. Date: Nov. 17, 2016

(65) Prior Publication Data
US 2018/0128619 A1    May 10, 2018

(30) Foreign Application Priority Data

May 8, 2015  (DE) .......................... 10 2015 107 265

(51) Int. Cl.
*G01C 21/16* (2006.01)
*G01D 1/14* (2006.01)
(Continued)

(52) U.S. Cl.
CPC ............ *G01C 21/165* (2013.01); *G01C 21/20* (2013.01); *G01D 1/14* (2013.01); *G01S 19/49* (2013.01); *G01C 21/3605* (2013.01)

(58) Field of Classification Search
CPC .. G01C 21/165; G01C 21/20; G01C 21/3605; G01D 1/14; G01S 19/49
(Continued)

(56) References Cited

U.S. PATENT DOCUMENTS 4,954,837 A * 9/1990 Baird ................... G01C 21/005
342/458
5,272,639 A * 12/1993 McGuffin ............. G01C 21/005
342/63
(Continued)

FOREIGN PATENT DOCUMENTS

CN        100389302 C      5/2008
CN        201266089 Y      7/2009
(Continued)

OTHER PUBLICATIONS

APM Navigation Extended Kalman Filter Overview, vol. 15, Jan. 18, 2016.
(Continued)

*Primary Examiner* — Jaime Figueroa
(74) *Attorney, Agent, or Firm* — Tarolli, Sundheim, Covell & Tummino LLP

(57) ABSTRACT

Method for determining states of a system by means of an estimation filter, in which first state values are determined by calculating a mean value of a probability distribution for the states, in which a probability for deviation for the case that the first state values deviate from the actual states of the system is calculated, and in which the states of the system are measured as state data. In the method the first state values are corrected by means of the state data then, if the probability for deviation is larger than a threshold.

11 Claims, 4 Drawing Sheets

Figure 1A:
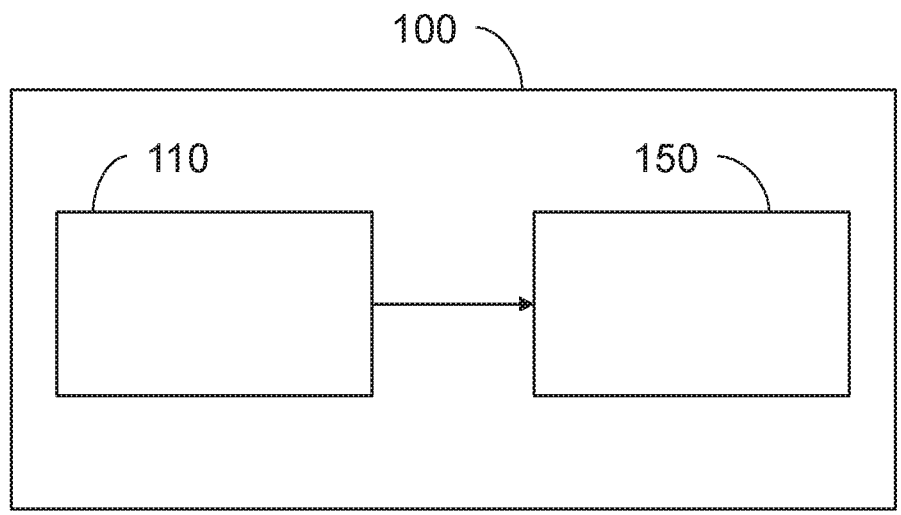

(51) Int. Cl.
  *G01S 19/49* (2010.01)
  *G01C 21/20* (2006.01)
  *G01C 21/36* (2006.01)

(58) Field of Classification Search
  USPC ...................................................... 701/1, 23
  See application file for complete search history.

(56) References Cited

U.S. PATENT DOCUMENTS

| | | | | |
|---|---|---|---|---|
| 5,331,562 A * | 7/1994 | McGuffin | ............ | G01C 21/005 |
| | | | | 342/63 |
| 5,596,332 A * | 1/1997 | Coles | ................... | G01S 5/0009 |
| | | | | 342/455 |
| 5,933,352 A * | 8/1999 | Salut | ...................... | G05B 21/02 |
| | | | | 700/169 |
| 6,928,341 B2 * | 8/2005 | Wise | .................... | G01P 13/025 |
| | | | | 244/181 |
| 8,594,927 B2 * | 11/2013 | Louis | ................... | G01C 21/165 |
| | | | | 701/30.2 |
| 8,886,394 B2 * | 11/2014 | Noonan | .................. | G01S 7/003 |
| | | | | 701/23 |
| 9,650,152 B2 * | 5/2017 | Claudel | ................. | B64D 45/00 |
| 2007/0265741 A1 | 11/2007 | Oi et al. | | |
| 2010/0312461 A1 * | 12/2010 | Haynie | ................ | B61L 25/025 |
| | | | | 701/117 |
| 2011/0106418 A1 * | 5/2011 | van der Merwe | ..... | G01C 21/12 |
| | | | | 701/532 |
| 2012/0022784 A1 * | 1/2012 | Louis | ................... | G01C 21/005 |
| | | | | 701/445 |
| 2012/0154210 A1 * | 6/2012 | Landau | .................. | G01S 19/04 |
| | | | | 342/357.23 |
| 2012/0286991 A1 * | 11/2012 | Chen | ...................... | G01S 19/04 |
| | | | | 342/357.23 |
| 2014/0149806 A1 * | 5/2014 | Khalastchi | ......... | G06K 9/00496 |
| | | | | 714/49 |
| 2016/0114903 A1 * | 4/2016 | Claudel | ................. | B64D 45/00 |
| | | | | 701/3 |
| 2017/0045624 A1 * | 2/2017 | Drescher | ................ | G01S 19/44 |

FOREIGN PATENT DOCUMENTS

| | | |
|---|---|---|
| CN | 103270543 A | 8/2013 |
| CN | 103529468 A | 1/2014 |
| TW | M405295 | 6/2011 |

OTHER PUBLICATIONS

Kenneth Gade, Introduction to Inertial Navigation and Kalman Filtering, Tutorial for IAIN World Congress, Stockholm, Oct. 2009, retrieved from the internet URL://www.navlab.net/Publications/Introduction_to_inertial_Navigation_and_Kalman_Filtering.pdf.
International Search Report for corresponding International Application No. PCT/EP2016/056389, dated Jul. 1, 2016.
Chinese Office Action corresponding to Chinese Application No. 2016800268883, dated Jun. 5, 2018.

* cited by examiner

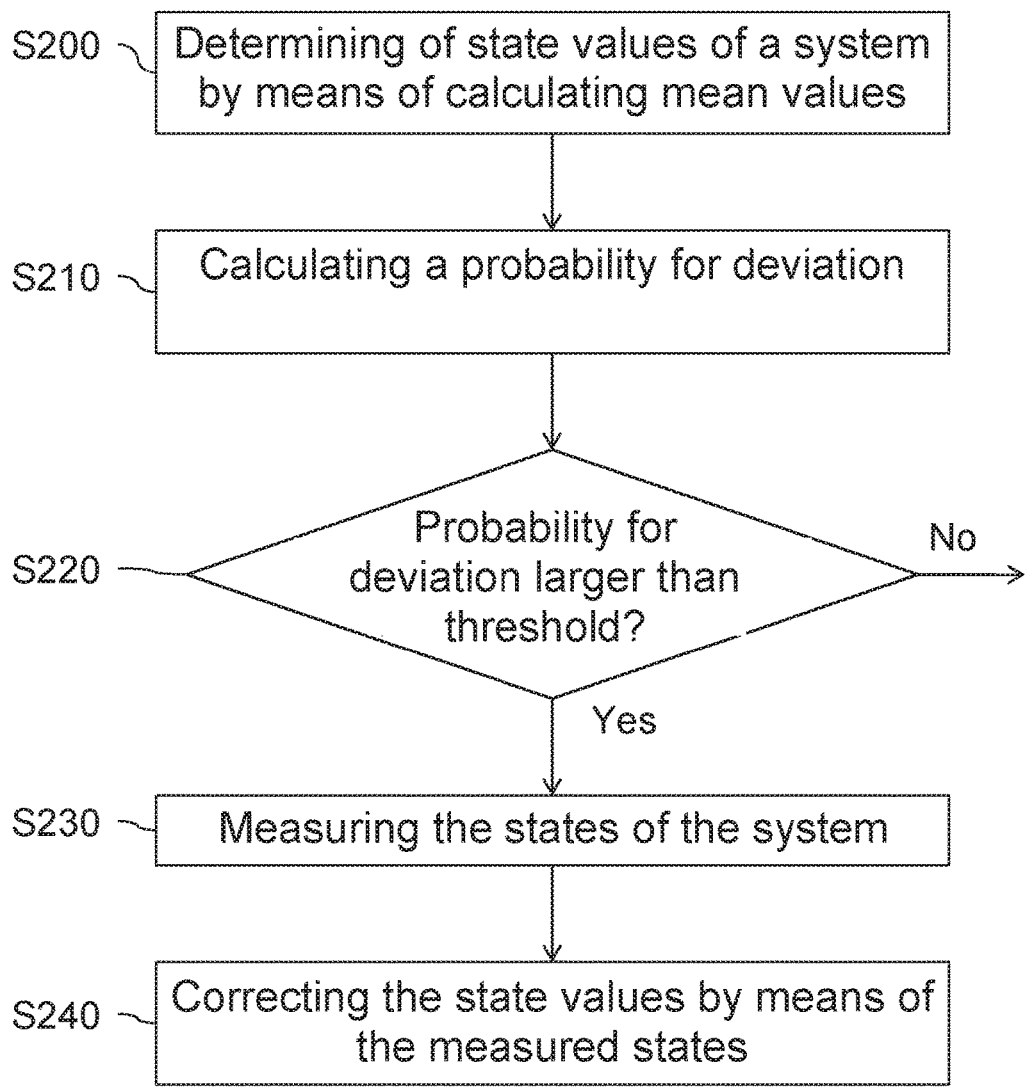

METHOD FOR DETERMINING STATES OF A SYSTEM USING AN ESTIMATION FILTER

RELATED APPLICATIONS

The present invention is a U.S. National Stage under 35 USC 371 patent application, claiming priority to Serial No. PCT/EP2016/056389, filed on 23 Mar. 2016; which claims priority of DE 10 2015 107 265.3, filed on 8 May 2015, the entirety of both of which are incorporated herein by reference.

In order to determine states of a system often state data are used that are determined using different methodology. In this process, the state data are typically affected by measurement errors such that the measured state data deviate from the actual states. Hence, it is necessary for determining the states of the system on the one hand to combine state data that are obtained in different manners and on the other hand to reduce falsification by measurement errors. To this end, estimation filters are often used that extrapolate based on previous status measurements the development of the system and indicate simultaneously a probability for the case that the status of the system calculated in that way coincides with the actual status. In order to couple the extrapolated states to the measured data they are compared to the measured state data and corrected after a certain time.

Such a method is in particular used for determining position data of an object, as for example of a vehicle, a ship, or an airplane. To this end, relative and absolute position data are collected, from which the estimation filter determines a navigation solution, i.e. position data that are necessary for navigation. As an estimation filter often a Kalman filter is used that estimates position data and corrects the position data with newly measured data sets iteratively. Here, in particular inertial measurement data, i.e. rotation rates and accelerations of the object, and absolute position data, i.e. the position with reference to a fixed reference system, are used. The Kalman filter allows evaluating the two kinds of position data for a common navigation solution. Typically, the relative position data are used for estimating the position, and the absolute data are used for correcting the solution.

In this process, in particular the correction step, i.e. the update of the filter, is particularly computationally intensive. If the data necessary for correction are available continuously, such a correction step is typically carried out in constant temporal intervals. Otherwise, a correction is then carried out, if the data necessary for correction have been collected. This leads to constant utilization of the processors used for calculating the correction and hence to constant energy consumption. On the other hand, the continuous correction leads to a higher precision of the filter. However, if such a high precision is not necessary or if the estimation filter operates due to a temporal extended operation such that also frequent corrections do not lead to an improvement of the quality, the processor used for calculating the navigation solution is unnecessarily utilized by continuous corrections and unnecessarily high energy consumption occurs.

An object of the present invention is to provide a method for determining states of a system by means of an estimation filter in which unnecessary utilization of a calculation processor and energy consumption therefrom resulting are reduced.

This problem is solved by the subject-matter of the independent claims. Advantageous further improvements are indicated in the dependent claims.

According to the invention a method for determining states of a system by means of an estimation filter comprises:

Determining first state values by calculating a mean value of a probability distribution for the state; calculating a probability for deviation for the case that the first state values deviate from the actual states of the system, and measuring the states of the system as state data. Here, if and only if the probability for deviation is larger than a threshold, the first state values are corrected by means of the state data.

Thus, by means of the estimation filter not only an estimation of the states is carried out, but also a quality of the estimation is calculated by means of the probability for deviation. The estimation values are only then corrected, if the quality of the estimation goes beyond a specific threshold. This is then the case, if the probability for deviation, which indicates the distance of the estimation from the actual status of the system, becomes larger than a predetermined threshold. The threshold may be fixed in advance or may be determined dynamically. In this manner, the quality of the whole status determination can be adjusted by means of the threshold. Moreover, the threshold can be defined to be different for different ways of determining the probability for deviation.

For applications that do not need a high quality or for which high quality is subsidiary the number of correction steps can be reduced in this manner. Due to this, utilization of a processor used for calculating the states can be reduced. Simultaneously, also the energy consumption of the processor is reduced due to the reduced utilization.

In the method the first state value may be determined in a first time increment. Then, if and only if the probability for deviation is equal to or smaller than the threshold, in a second time increment following the first time increment second state values are determined based on the first state values. If the probability for deviation is larger than the threshold, the second state values are determined in the second time increment base on the corrected first state values.

Therefore, if the quality of the estimation value is not sufficiently high and the first state values have thus been corrected in the first time increment, the estimation in the second time increment is based on these corrected state values. Otherwise, for a sufficient quality of the estimation no correction has been carried out in the first time increment. Then, the estimation in the second time increment is based on the non-corrected first state values that have been estimated in the first time increment.

This allows carrying out the estimation by means of the estimation filter iteratively over several time increments without the need to carry out a correction. On the other hand, by taking into account the probability for deviation, the correction can then be carried out, if the estimation becomes imprecise. The estimation following the correction has then a higher precision, because of the corrected estimation values on which it is based. It is therefore possible to keep the processor load and the energy consumption low and to reach on the other hand a sufficiently high quality for the estimation.

The estimation filter may be a Kalman filter and the states of the system may determine a position of an object. Then, the state values are position values that indicate the position and the measured state data are position data.

This allows determining navigation solutions for vehicles such as ships or aircrafts, which have a sufficiently high precision, and simultaneously keeping the energy consumption for determining the navigation solution at low level. This is advantageous amongst others for aircrafts such as unmanned aerial vehicles (UAV) or unmanned aerial systems (UAS) that have long mission or operation periods and need to have low energy consumption. In this case the threshold may for example be the maximally allowed horizontal position error. Moreover, mission and navigation data processors of UAVs may be combined, which leads to a reduction in weight and allows longer mission or operation periods.

The position data may comprise an absolute position of the object and relative position changes of the object. Here, the relative position changes are used to determine the mean value of the probability distribution for the position, while the absolute position is used to correct the position values.

This leads to an optimal combination of different measured position data. The relative position changes such as rotation rates or accelerations of the object are used to estimate based on the previous estimation values the further movement of the object. The absolute position data that are obtained with respect to a specific reference system such as longitude and latitude can be used to correct the estimation.

On the other hand, measurement errors of the absolute position data for determining the position are less dominating, as they are only then not recognized as measurement errors, if the estimation is affected by similar errors. Hence, two different kinds of position determinations are combined with each other to reduce mutually the influence of measurement errors. Simultaneously, by the condition that a correction is only carried out, if the quality of the estimation becomes too poor, it is guaranteed that the energy consumption for the position determination is kept at a low level.

The position data may be measured by means of a satellite navigation system and a linear acceleration and/or rotation rate sensor. This ensures that the position data capturing can be automated, which makes a frequent monitoring or an involved determination by humans unnecessary.

To measure the position data a micro electromechanical sensor (MEMS) may be used. This allows miniaturization of the devices necessary for carrying out the method, which guaranties a wide range of possible applications for the method. Instead, also fiber optic sensors (e.g. fiber optic gyroscopes) or ring laser gyroscopes may be used to measure the position data.

The probability for deviation may be determined based on a covariance matrix of the probability distribution. Typically, such covariance matrices are generated automatically in an estimation filter such as a Kalman filter. Hence, the calculation of the probability for deviation can be included without additional processing steps into already existing filters such that no additional processor load or additional time loss occurs.

The probability for deviation may, however, also be determined based on a residuum, i.e. the comparison between the estimated and the measured position. This makes a flexible use of the quality adjustment possible, as it might be necessary under certain condition to take into account not only the covariance matrix calculated in the filter, but to have a second basis for the determination of the estimation quality. Thus, by the alternative or additional use of a residuum the flexibility of the applicability of the method is extended.

A device for determining a position of an object comprises a measurement unit that is configured to measure position data and a calculation unit having an estimation filter that is configured to determine first position values by calculating a mean value of a probability distribution for the position and to calculate a probability for deviation for the case that the first position values deviate from the actual position of the object. Here, the calculation unit is configured to correct the first position values by means of the position data if and only if the probability for deviation is larger than the threshold value.

This device ensures that a method according to the present invention can be carried out due to which the position of an object can be determined without unnecessary utilization of the calculation unit, e.g. a processor, and without unnecessary energy consumption.

The measurement unit may comprise a satellite navigation system and a linear acceleration and/or rotation rate sensor. Here, the linear acceleration and/or rotation rate sensor is configured to measure relative position changes that are used to determine the mean value of the probability distribution for the position. On the other hand, the satellite navigation system is configured to measure an absolute position that is used to correct position values. This ensures that the device uses a basis of measurement values for a position determination, which is as broad as possible, wherein the measurement values are combined optimally by the estimation filter. Due to this, the necessary precision for position determination can be realized simultaneously with reduced energy consumption.

An unmanned aerial vehicle or an unmanned aerial system may operate according to the method descried above. The unmanned aerial vehicle or the unmanned aerial system may comprise one of the devices described above. This ensures that the navigation solutions used by these aerial vehicles or systems have a sufficiently high precision and keep at the same time the energy consumption for determining the navigation solution at a low level. In case of low energy consumption also long mission or operation periods of the aerial vehicle or system can be realized.

Figure 1B:
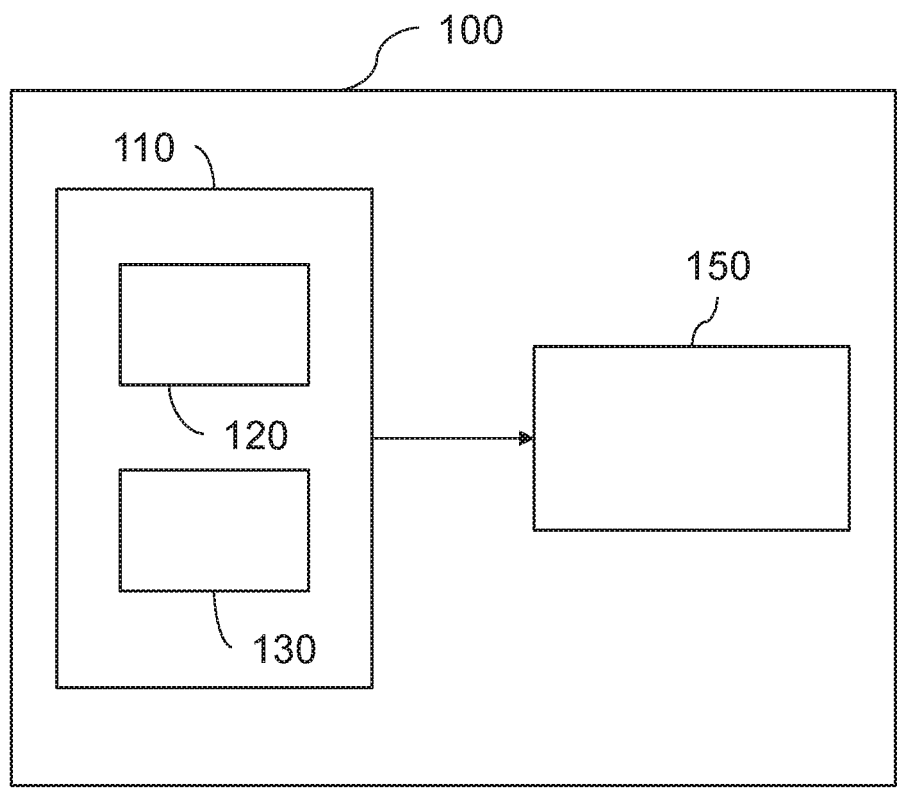
Figure 3:
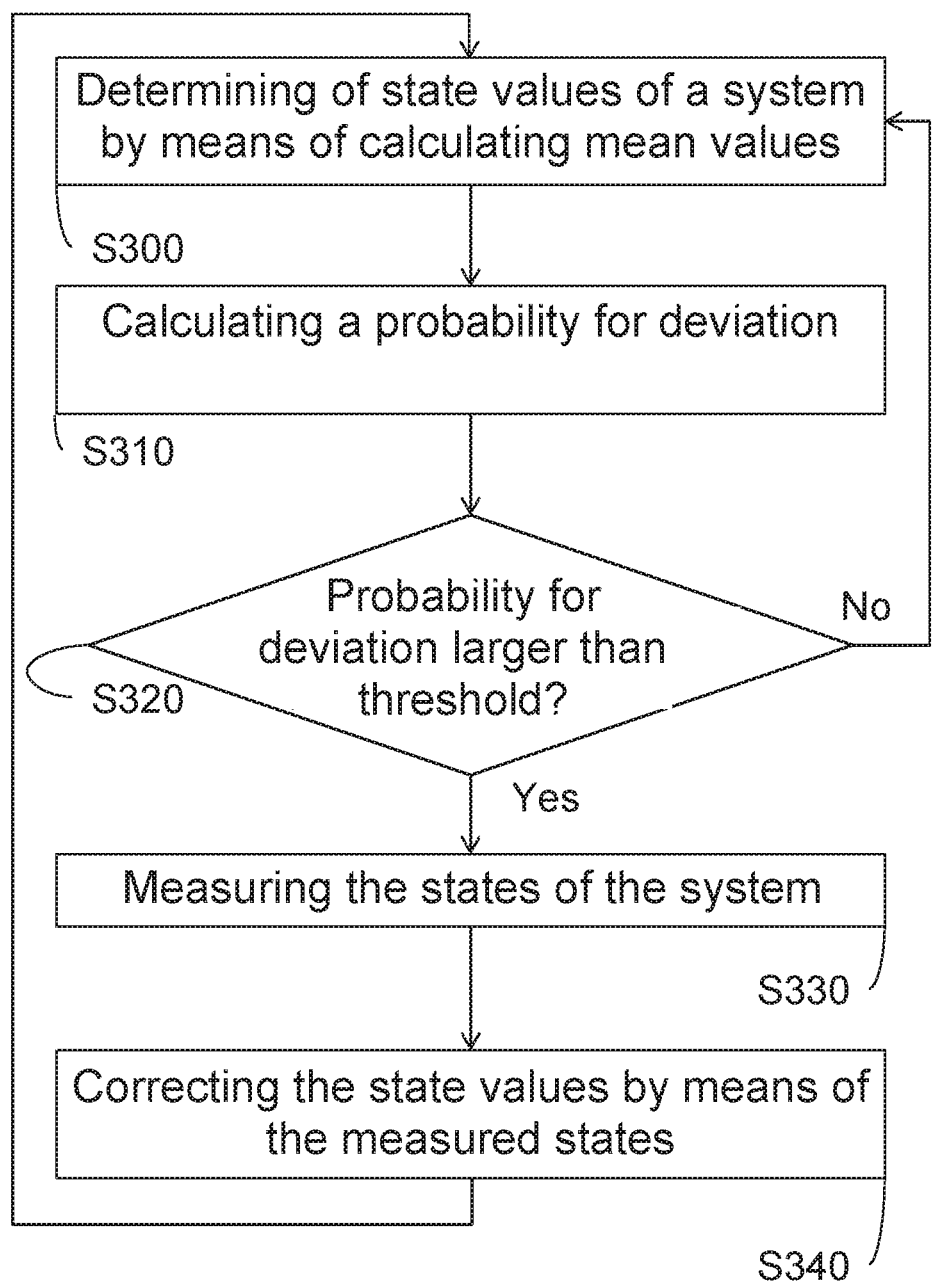
Figure 4:
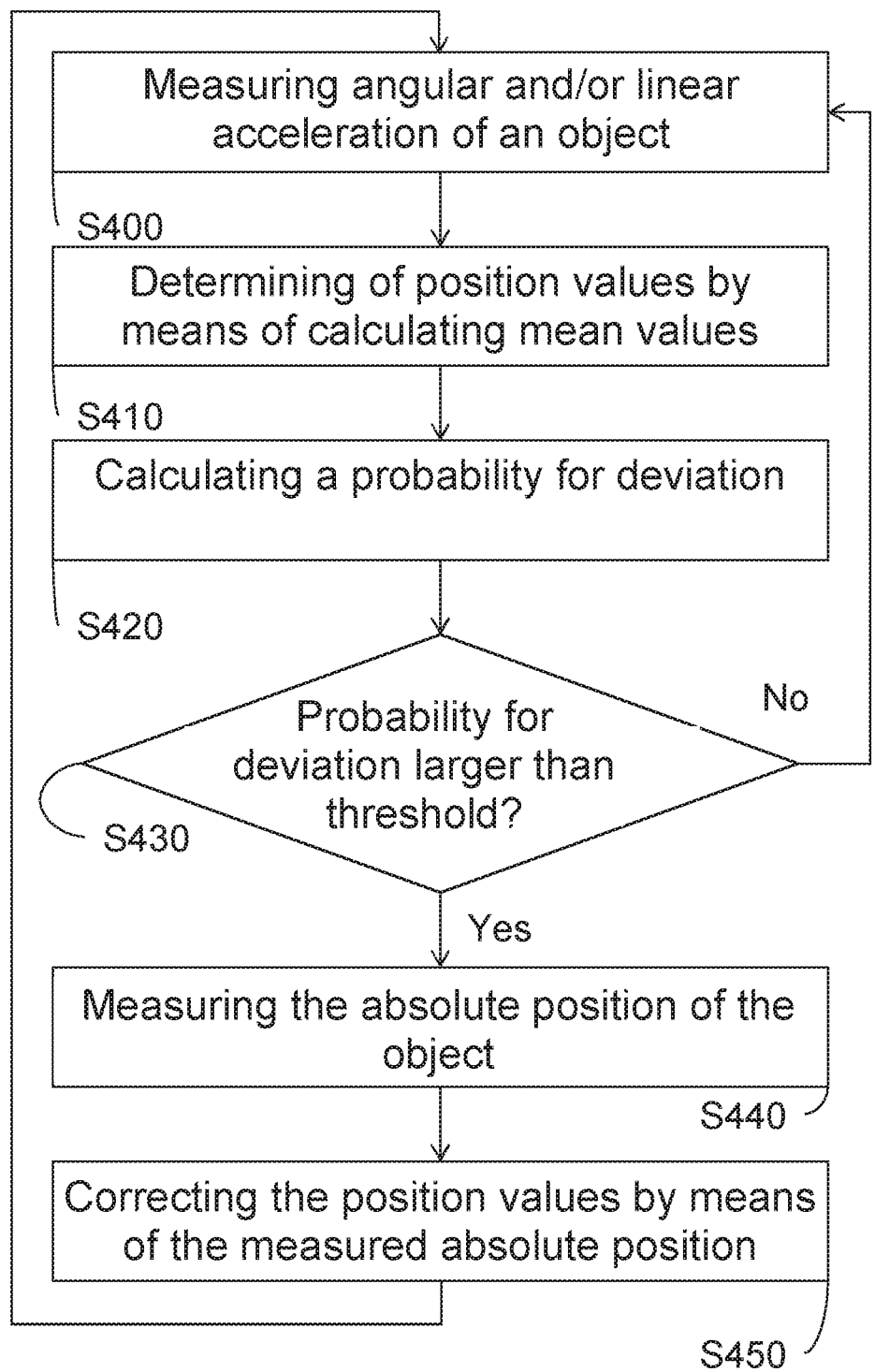

In what follows embodiments of the invention, their functions as well as their advantages are described with respect to the figures. Elements of the embodiments can be combined with each other unless they exclude each other. It show:

FIGS. 1A and 1B embodiments of devices for determining states of a system by means of an estimation filter;

FIG. 2 a method for determining states of a system by means of an estimation filter according to an embodiment;

FIG. 3 a method for determining states of a system by means of an estimation filter according to a further embodiment; and FIG. 4 a method for determining a position of an object by means of an estimation filter according to an embodiment.

FIG. 1A illustrates a device 100 for determining states of a system. To this end, the device 100 comprises a measurement unit 110 and a calculation unit 150.

The measurement unit 110 is configured to measure different states of the system and to output the measured states as state data.

The calculation unit 150, e.g. a computer or a processor, calculates based on the state data that have been measured from the measurement unit 110 the states of the system. To this end, the calculation unit 150 uses an estimation filter, i.e. an algorithm by means of which state values can be estimated.

The estimation filter calculates based on the state data the mean value of a probability distribution for the states. At the same time the estimation filter determines the probability for the case that the calculated mean values for the states deviate from the actual states of the system.

According to an embodiment the quality value can be formed from this probability for deviation. The quality value is the higher the larger the deviation is. According to another embodiment the quality value is the smaller, the larger the deviation is. Then, the quality value is proportional to the quality of the measurement.

Based on the probability for deviation it is determined, whether the state values estimated by the estimation filter are corrected or not. The estimation values are corrected, if the probability for deviation is larger than a predetermined threshold.

This ensures that a correction of the estimated values that is computationally involved is only then carried out, if the estimation is too imprecise for a further use, i.e. if the quality of the estimation becomes too low. Then, the calculation unit 150 carriers out corrections of the estimated state values only, if this is really necessary. Due to this, utilization of the calculation unit 150 and hence energy consumption is reduced.

According to an embodiment the states determined by the device 100 are abstract parameters, e.g. purely mathematical parameters or parameters of a mathematical model, for example an economic model. According to a further embodiment the states are concrete parameters of a system, e.g. concrete measurement results.

According to an embodiment the device 100 is used to determine a position of an object. To this end, the measurement unit 110 measures position data and the estimation filter of the calculation unit 10 determines position values by calculating a mean value of a probability distribution for the position. If the quality of this estimation is too low, i.e. if a probability for deviation, which describes the deviation of the position values from the actual position, is larger than a threshold, the estimation filter corrects the position values by means of further position data measured by the measurement unit 110.

This allows using the above described reduction of load from the calculation unit 150 also for the calculation of position data and navigation solutions.

FIG. 1B illustrates the device 100 in further detail. The measurement unit 110 comprises a satellite navigation system 120 and a linear acceleration and/or rotation rate sensor 130.

The satellite navigation system 120 may be used to determine an absolute position of the object on Earth's surface by triangulation between several satellites positioned in the orbit of the earth. The satellite navigation system 120 measures, hence, an absolute position of the object with respect to Earth's surface.

The linear acceleration and/or rotation rate sensor 130 measures, in contrast, a relative position change of the object, such as rotation rates or accelerations of the object. It is hence possible to calculate the movement of the object in space by integrating the equations of motion by means of the data measured by the linear acceleration and/or rotation rate sensor 130. The linear acceleration and/or rotation rate sensor 130 may for example be a micro electro-mechanical sensor (MEMS). To measure the rotation rates fiber optic sensors (e.g. fiber optic gyroscopes), ring laser gyroscopes and the like may also be used.

In the calculation unit 150 the relative position changes are used to estimate the position of the object. As each measurement is affected by a measurement error it is not possible to calculate the position exactly. The position can only be estimated within the measurement precision. As various measurement errors accumulate in the course of time, also the estimation becomes more and more imprecise in the course of time. Therefore, it is necessary to correct the estimation to satisfy precision requirements.

To this end, the absolute position data are used, which are compared to the estimated position values calculated by the estimation filter. In this manner, it is possible to compensate measurement errors of the relative position changes by means of absolute position measurements.

On the other hand, also the absolute position measurements can be affected by errors. However, this becomes only relevant, if the estimation based on the relative position changes has the same error trend as the absolute position measurement. But as measurement errors fluctuate statistically, this will normally not be the case. Therefore, also the estimation can be used for correcting measurement errors of absolute position measurements.

According to an embodiment the estimation filter calculates the variances and covariance of the mean value automatically. The larger the entries in the resulting covariance matrix are, the worse the estimation is. If, in contrast, the entries are small, it is not necessary to correct the estimation. This ensures that no unnecessary correction steps are carried out, which utilize the calculation unit 150 unnecessarily and lead to unnecessary energy consumption.

According to a further embodiment alternatively or additionally a residuum may be used as probability for deviation, which indicates the deviation of the estimated data from the position determined by measurements. Also in this manner it can be prevented that unnecessary correction steps are carried out, if the estimation is still sufficiently good.

In what follows different methods are described by which the device 100 can determine states of a system.

FIG. 2 shows a flowchart of an embodiment of a method for determining state values of a system.

At S200 state values of a system are determined by calculating a mean value of a probability distribution for the states. This means, that state values are estimated based on a probability distribution. To this end, an estimation filter, such as a Kalman filter, is used. The probability distribution for the state values to be estimated is obtained in this process from previous measurements of the states that are affected by measurement errors.

Based on the estimation a probability for deviation is calculated. The probability for deviation is the larger the larger the probability is that the state values deviate from the actual states of the system. The larger the probability for deviation is, the less precise is the estimation and the less is a quality of the estimation. The quality of the estimation needs therefore to be improved as soon as the probability for deviation becomes too large.

According to a further embodiment, a quality value is calculated from the probability for deviation, which is small for a large probability of large deviations of state values from the actual states. This means, the smaller the quality value gets, the less is the quality of the estimation. Then, the quality has to be improved, if the quality value becomes too small.

At S220 the probability for deviation is compared with a threshold. It is determined, whether the probability for deviation is larger than the threshold. If this is not the case (no), no correction of the state values is carried out. Alternatively, the quality value is compared. Then a correction is omitted, if the quality value is sufficiently large.

If the probability for deviation is larger than the threshold value (yes), the states of the system are measured anew and the state values are corrected by means of the measured states. According to a further embodiment the states of the system have been measured already before and are only then used for correcting the state values, if it has been determined that the probability for deviation is larger than the threshold.

This method ensures that state values are only corrected if necessary. This allows reducing utilization of a calculation unit, e.g. a computer or processor, carrying out the estimating and correcting and hence reducing the energy consumption.

FIG. 3 shows a schematic flowchart of a further embodiment of a method for determining states of a system.

The method according to FIG. 3 corresponds largely to the method according to FIG. 2. Hence, only the steps of the method are explained that differ.

The methods differ from each other therein that according to the method according to FIG. 3 the state values are estimated in a step S300 iteratively. If the probability for deviation is larger than the threshold the state values are corrected by means of further measured states just as in the method described with respect to FIG. 2. Then, the corrected states are used to estimate in a further time increment state values anew that are based on the corrected state values of the previous time increment.

Is, in contrast, the probability for deviation not larger than the threshold, the correction step is skipped and in the following time increment the state values are estimated based on the non-corrected state values that have been determined in the previous time increment.

This allows carrying out a series of estimations without executing correction steps in-between. As long as the iteratively determined estimation values have a quality that is large enough, the correction of the estimation can be omitted. Only if after a certain time the quality drops below a predetermined threshold due to measurement errors or because of other reasons, a correction step is inserted that leads to a quality of estimation in an allowed range. It is hence possible to limit the number and frequency of calculational intensive correction steps via the threshold such that utilization and energy consumption of a processor that carriers out the estimation are reduced.

FIG. 4 shows a schematic flowchart of an embodiment of a method according to the invention according to which a position of an object, such as a vehicle, a ship or aircraft is determined as status of a system.

To this end, at S400 the rotation rate and/or the linear acceleration of the object is measured. This is for example carried out with an inertial sensor, e.g. a micro electro-mechanical sensor or with rotation rate sensors formed as fiber optic gyroscopes or ring laser gyroscopes. These relative position changes are fed at S410 into a Kalman filter that determines position values by calculating a mean value of a probability distribution for the position.

In addition, At S420 a probability for deviation is calculated, i.e. the probability for a deviation of the position values from the actual position. This probability for deviation is compared at S430 to a threshold. If the probability for deviation is larger (yes) than the previously predetermined threshold, a correction of the previously estimated position values is carried out.

At S440 the absolute position of the object is measured. To this end, for example a satellite navigation system is used that indicates the position of the object with respect to a fixed reference system such as longitude and latitude of Earth. At S450 the position value is corrected by means of the measured absolute position. The corrected position values serve as starting point for the estimation of the position in the next time increment.

If it is determined at S430 that the probability for deviation is not larger than the threshold, the correction of the position values is omitted and the Kalman filter proceeds directly to the next estimation, which is then based on the position values determined in the previous time increment and the newly measured relative position changes.

Using this method it is possible to combine data of inertial measurement and absolute position measurements in a Kalman filter such that a correction step is only carried out if the quality of the estimation becomes too low. This ensures that calculational intensive correction steps are only then carried out, if they are really necessary. Due to this utilization of processors and hence energy consumption can be reduced.

The invention claimed is:

1. A method for determining states of a system by means of an estimation filter, comprising:
   determining of first state values by calculating mean values of respective probability distributions for each of the states by the estimation filter;
   calculating a probability for deviation in the case that the first state values deviate from the actual states of the system by the estimation filter;
   measuring the states of the system as state data; and
   then, if the probability for deviation is greater than a threshold, correcting the first state values by means of the state data.

2. The method according to claim 1, wherein
   the first state values are determined in a first time increment;
   then, if the probability for deviation is equal or smaller than the threshold, second state values are determined based on the first state values in a second time increment following the first time increment; and
   then, if the probability for deviation is greater than the threshold, the second state values are determined in the second time increment based on the corrected first state values.

3. The method according to claim 1, wherein
   the estimation filter is a Kalman filter;
   the states of the system determine a position of an object;
   the state values are position values, which indicate the position; and
   the measured state data are position data.

4. The method according to claim 3, wherein
   the position data comprise an absolute position of the object and relative position changes of the object;
   the relative position changes are used to determine the mean value of the probability distribution for the position; and
   the absolute position is used to correct position values.

5. The method according to claim 3, wherein
   the position data are measured by means of a satellite navigation system and a linear acceleration sensor and/or rotation rate sensor.

6. The method according to claim 3, wherein
   a micro electro-mechanical sensor (MEMS), a fiber optic sensor, or a ring laser gyroscope are used for measuring the position data.

7. The method according to claim 1, wherein the probability for deviation is determined based on a covariance matrix of the probability distribution.

8. The method according to claim 1, wherein the probability for deviation is determined based on at least one residuum.

9. A device for determining a position of an object, comprising
   a measurement unit suited to measure position data; and
   a calculation unit having an estimation filter that is suited to determine first position values by calculating mean values of respective probability distributions for the position by the estimation filter;

calculate a probability for deviation in the case that the first position values deviate from the actual position of the object by the estimation filter; and then, if the probability for deviation is greater than a threshold, correct the first position values by means of the position data.

10. The device according to claim 9, wherein the measurement unit comprises a satellite navigation system and a linear acceleration sensor and/or rotation rate sensor;

the linear acceleration sensor and/or rotation rate sensor is suited to measure relative position changes that are used to determine the mean value of the probability distribution for the position; and wherein the satellite navigation system is suited to measure an absolute position that is used to correct position values.

11. An unmanned aerial vehicle comprising a device according to claim 9.

\* \* \* \* \*